United States Patent
Vanneste et al.

(10) Patent No.: US 7,337,604 B2
(45) Date of Patent: Mar. 4, 2008

(54) HYBRID HIGH ELONGATION CORD

(75) Inventors: Stijn Vanneste, Ingelmunster (BE); Hans Cauwels, Adegem (BE)

(73) Assignee: NV Bekaert SA, Zwevegem (BE)

( * ) Notice: Subject to any disclaimer, the term of this patent is extended or adjusted under 35 U.S.C. 154(b) by 0 days.

(21) Appl. No.: 10/564,966

(22) PCT Filed: Jun. 25, 2004

(86) PCT No.: PCT/EP2004/051252

§ 371 (c)(1),
(2), (4) Date: Feb. 15, 2006

(87) PCT Pub. No.: WO2005/014925

PCT Pub. Date: Feb. 17, 2005

(65) Prior Publication Data

US 2006/0179813 A1   Aug. 17, 2006

(30) Foreign Application Priority Data

Jul. 22, 2003   (EP) .................................. 03102245

(51) Int. Cl.
*D02G 3/22* (2006.01)
(52) U.S. Cl. .............................. 57/220; 57/222; 57/231
(58) Field of Classification Search .................. 57/212, 57/216, 237, 238, 902, 220, 222, 231; 152/451, 152/527, 556, 557
See application file for complete search history.

(56) References Cited

U.S. PATENT DOCUMENTS

| | | | | |
|---|---|---|---|---|
| 2,113,710 A | * | 4/1938 | Riddle | ................. 57/212 |
| 3,686,855 A | * | 8/1972 | Falcy et al. | ................. 57/220 |
| 4,176,705 A | | 12/1979 | Russell et al. | |
| 4,408,444 A | | 10/1983 | Baillievier | |
| 4,676,058 A | * | 6/1987 | Foley et al. | ................. 57/218 |
| 6,007,912 A | | 12/1999 | Doujak | |
| 6,146,760 A | * | 11/2000 | Helfer et al. | ................. 428/377 |
| 6,334,293 B1 | * | 1/2002 | Poethke et al. | ................. 57/210 |
| 7,152,391 B2 | * | 12/2006 | Vanneste et al. | ................. 57/237 |
| 2003/0051788 A1 | | 3/2003 | Besson et al. | |

FOREIGN PATENT DOCUMENTS

| | | |
|---|---|---|
| EP | 0 790 349 B1 | 6/2000 |
| WO | WO 02/088459 A1 | 11/2002 |

* cited by examiner

*Primary Examiner*—Shaun R. Hurley
(74) *Attorney, Agent, or Firm*—Foley & Lardner LLP

(57) ABSTRACT

An elongation cord adapted for the reinforcement of elastomer structures has a polymer core and three to nine strands twisted around the core with a cord twisting step in a cord twisting direction. At least one of the strands a first group of filaments and a second group of filaments. The first group of filaments is twisted with a first twisting step in a first twisting direction and the second group of filaments is twisted with a twisting step in a second twisting direction. The first twisting step is different from the second twisting step or the first twisting direction is different from the second twisting direction, or both. The first twisting direction is equal to the cord twisting direction and the first twisting step is equal to the cord twisting step.

8 Claims, 3 Drawing Sheets

HYBRID HIGH ELONGATION CORD

FIELD OF THE INVENTION

The present invention relates to an elongation steel cord adapted for the reinforcement of elastomer structures, more particularly adapted for the reinforcement of the outermost plies of rubber tires.

BACKGROUND OF THE INVENTION

Elongation cords, such as high-elongation cords, are used to reinforce the belt of a radial tire. This can be the radially outermost ply, also called a protection ply, or an intermediate layer. The protection ply is the ply which lies closest to the tread and thus to the surface. As a direct result of its position in a tire and as its name says, a protection ply fulfills a front line function in the protection of a tire: Every unevenness and every roughness on the roads are first felt and taken up by the protection ply.

The elongation cord can also be used In other parts of the belt as strips or covering the whole width of the belt. Very often the elongation cords are used under a nearly 0° angle with respect to the equatorial plane of the tire, so in a circumferential direction. In this way the elongation cord can stabilize the belt edges and also control the belt deformation e.g. In case of a wide belt (low aspect ratio tire). A typical example for that is the so-called super single drive axle tire, this is one single wide tire replacing the normal 2 tires on every side that transmit the motor power of a truck to the road.

Consequently, severe requirements are put on cords reinforcing these protection plies.

First of all, the elongation cords must have a high corrosion resistance, since moisture that is able to penetrate via cracks in the tread is most likely to arrive first at the protection ply. Full rubber penetration is a way to slow down the corrosion attack on steel cords. The elongation cords must have—as their name expresses it—a high elongation before they break.

Thirdly, the elongation cords must allow an easy manufacture of the tires when they are used under a nearly 0° angle with respect to the equatorial plane. For that reason a high elongation at low loads is required in order to follow the tire expansion when the green tire Is not present, the elongation cords risk to get into contact with steel cord of other plies.

Finally, the elongation cords must be cheap in manufacture.

An example of a high-elongation cord is the well-known 3×7×0.22 SS high-elongation (HE) steel cord with an elongation at fracture of about 7.5%.

Such a cord, however, is expensive to manufacture, due to its multi-strand construction and due to their small twisting steps, which are required to make the steel cord construction springy and obtain the final elongation.

The prior art has already provided alternative cords which provide the required elongation at fracture and which are less costly from a manufacturing point of view. However, while providing a cheaper alternative, prior art cords do not provide a good rubber penetration.

SUMMARY OF THE INVENTION

It is an object of the present invention to avoid the drawbacks of the prior art.

It is another object of the present invention to provide an alternative for a high-elongation cord.

It is yet another object of the present invention to provide a cord with a full rubber penetration.

It is a further object of the present invention to provide an elongation cord, which allows for an easy manufacture of the tire.

According to the invention there is provided an elongation cord adapted for the reinforcement of elastomer structures. The elongation cord comprises a core and three to nine strands twisted around the core with a cord-twisting step in a cord twisting direction. The core is a polymer core in order to provide the required elongation at fracture. At least one of the strands—and preferably more than one strand, and most preferably all of the strands—comprises a first group of filaments and a second group of filaments. These filaments are preferably steel filaments. The first group of filaments is twisted with a first twisting step in a first twisting direction. The second group of filaments is twisted with a second twisting step in a second twisting direction. The first group of filaments is different from the second group of filaments in that either the first twisting step is different from the second twisting step, or the first twisting direction is different from the second twisting direction, or both.

The first twisting direction is equal to the cord twisting direction and the first twisting step is equal to the cord twisting step.

The first group of filaments may comprise between two and five filaments. The second group of filaments may comprise between one and five filaments.

Following combinations are possible:

| 2 + 1 | 3 + 1 | 4 + 1 | 5 + 1 |
| 2 + 2 | 3 + 2 | 4 + 2 | 5 + 2 |
| 2 + 3 | 3 + 3 | 4 + 3 | 5 + 3 |
| 2 + 4 | 3 + 4 | 4 + 4 | 5 + 4 |
| 2 + 5 | 3 + 5 | 4 + 5 | 5 + 5 |

It is hereby understood that the first number is the number of filaments of the first group and the second number is the number of filaments of the second group.

The polymer for the core may be selected amongst:
- A thermoplastic polyester based on polybutylenterephtalat or on polyetheleneterephtalat;
- A copolyester;
- A thermoplastic polyurethane; and
- A polyamide.

The polymer is preferably a polyester or a polyamide.

The Invention cord has a structural elongation (blank, i.e. not embedded in rubber) of at least 1.20%, e.g. at least 1.30. Such a relatively high level of structural elongation—at low or even no-existing loads—facilitates the manufacturing of the tire since it prevents the elongation cords in the outermost protection layer from contacting the steel cords in the rubber plies immediately under the protection layer.

The invention cord has an elongation at break (blank, i.e. not embedded in rubber) of at least 5%.

An example of a cord according to the invention is:

0.45 polyamide+4×(3×0.23+2×0.23)

0.45 mm is the initial diameter of the polyamide core the pitch of the second group of two filaments in the final cord is 4.6 mm;
the pitch of the first group of three filaments in the final cord and of the final cord is 6.0 mm.

Preferably the polymer core has a thickness, which Is at least equal to or greater than the smallest diameter of the filaments in the first group or in the second group.

Most preferably, the polymer core has a thickness, which is at least equal to or greater than two times the smallest diameter of the filaments in the first group or in the second group.

The thicker the polymer core, the higher the structural elongation and the higher the elongation at break.

BRIEF DESCRIPTION OF THE DRAWINGS

The invention will now be described into more detail with reference to the accompanying drawings wherein.

DESCRIPTION OF THE PREFERRED EMBODIMENTS OF THE INVENTION

Figure 1:
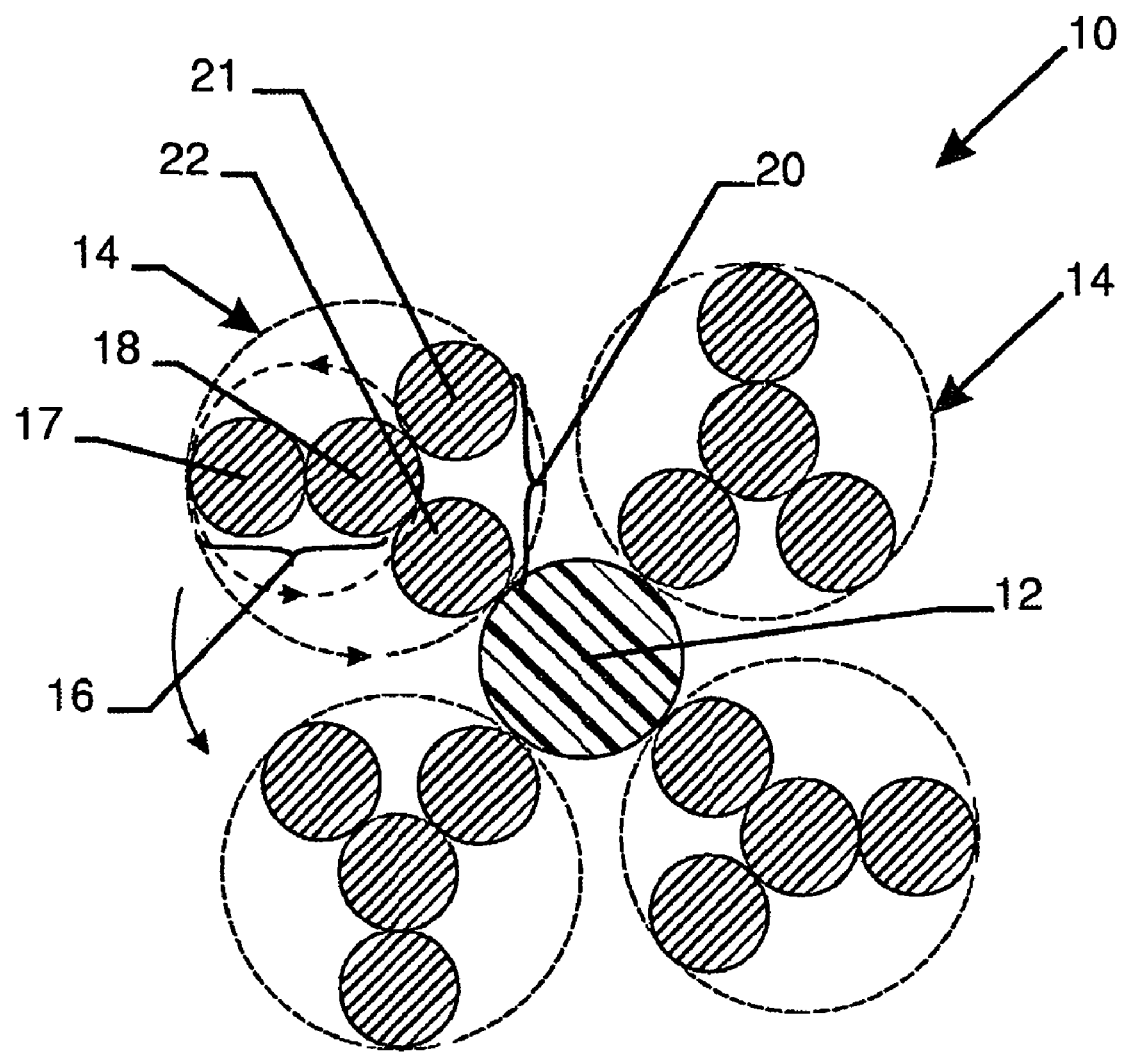
FIG. 1 is a schematic drawing of a cross-section of an elongation cord according to the invention.

FIG. 1 shows a schematic drawing of a hybrid elongation cord 10 according to the invention. The elongation cord 10 has a polyester core 12. Four strands 14 have been twisted around core 12. Each strand 14 has two groups of steel filaments: A first group 16 with steel filaments 17 and 18 and a second group 20 with steel filaments 21 and 22. The twisting pitch of the filaments 17 and 18 in the first group 16 is equal to the twisting pitch of the strands 14 around the polyester core 12. The twisting direction of the filaments 17 and 18 in the first group 16 is equal to the twisting direction of the strands 14 around the polyester core 12.

A hybrid elongation cord 10 can be manufactured as follows. First of all, the stranding takes place: All the strands 14 are manufactured individually and in advance. The way of manufacturing the strands 14 has been disclosed in U.S. Pat. No. 4,408,444. The result is a strand with two groups of steel filaments:

A first group of steel filaments 17, 18 which are untwisted or nearly untwisted, i.e. with a twisting step of more than 200 mm;

A second group of steel filaments 21, 22 that are twisted around each other filaments with a same twisting step and in a same twisting direction as they are twisted around the first group of steel filaments.

In a second step, the strands 14 are twisted around the polymer core 12 by means of a double-twisting device (often called buncher). Since the steel filaments 17, 18 out of the first group 16 have a twisting step between 200 mm and an infinite value; this first group takes about the same twisting step and twisting direction as the twisting step and the twisting direction of the final cord 10.

Figure 2:
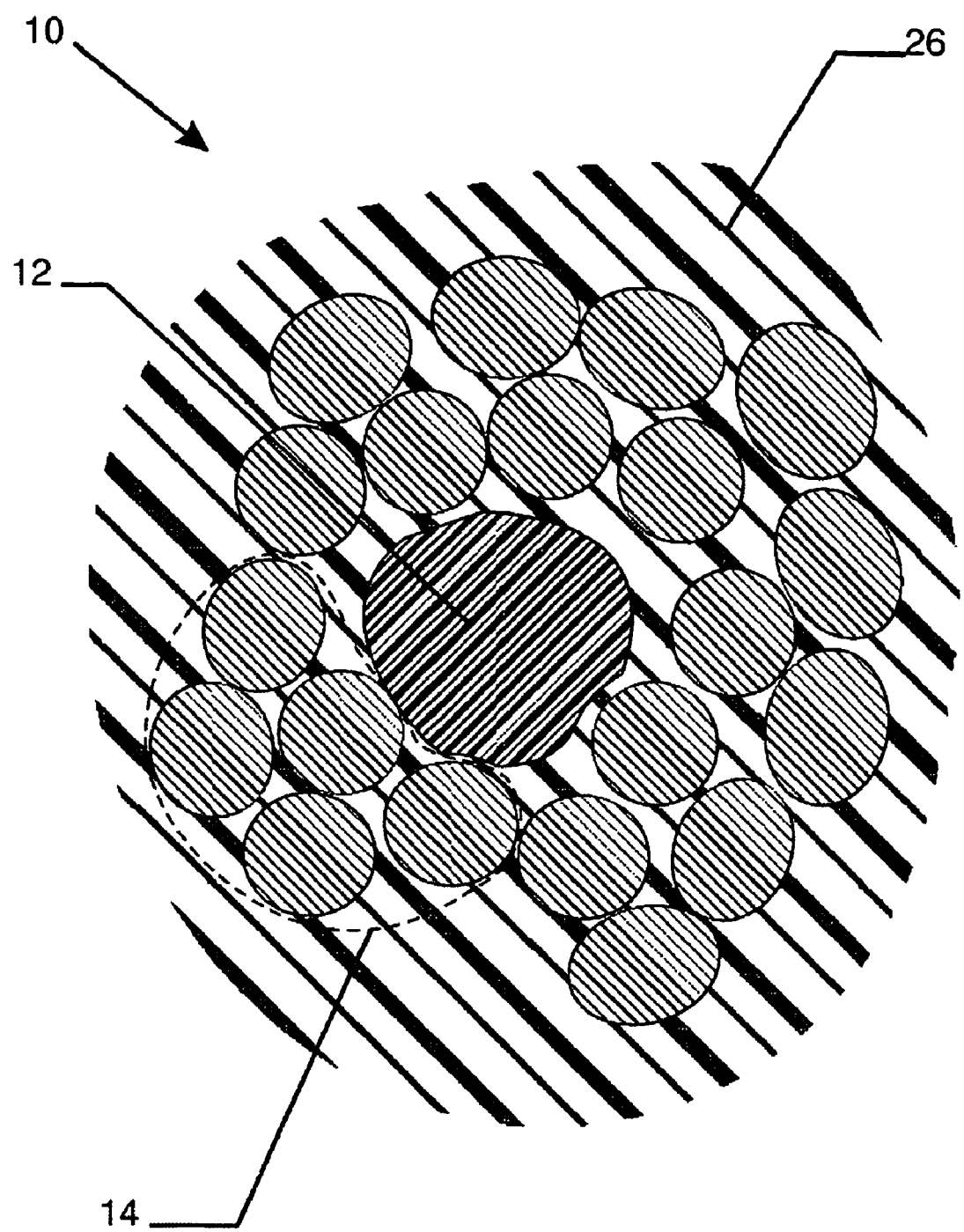
FIG. 2 is a cross-section of a effectively made elongation cord according to the invention.

FIG. 2 shows a more realistic picture of a cross-section of an effectively made elongation cord according to the invention. The steel cord 10 has a polyester core 12, which is no longer exact circular. The individual strands 14 around the polymer core 12 are not so easy to distinguish from one another and the filaments inside each strand of the first group and of the second group are no longer to be distinguished from each other, at least not from one single cross-section. The filaments show a more elliptic cross-section as they are twisted around the polymer core 12. Rubber 26 is able to penetrate everywhere between the individual filaments.

Comparison Tests.

Following cord has been used as reference cord:

REF 4×(3×0.22+2×0.22)4.5/6.0 SS without polymer core
    4.5 mm is the strand twisting step in the final cord of the filaments of the second group
    6.0 mm is the strand-twisting step in the final cord of the filaments of the first group and is also the final cord twisting step.

This reference cord is compared with following invention cords:

INV1 PET core 0.22 mm+4×(3×0.22+2×0.22)4.5/6.0SS

INV2 PET core 0.28 mm+4×(3×0.22+2×0.22)4.5/6.0SS

INV3 Polyamide core 0.45 mm+4×(3×0.22+2×0.22)4.5/6.0SS

|  | REF | INV1 | INV2 | INV3 |
|---|---|---|---|---|
| Optical diameter (mm) | 1.379 | 1.401 | 1.413 | 1.497 |
| Tensile test blank | | | | |
| Breaking load Fm (Newton) | 1644 | 1693 | 1694 | 1658 |
| Tensile strength Rm (MPa) | 2010 | 2006 | 2000 | 1887 |
| Total elongation at fracture Ats (%) | 4.83 | 5.55 | 5.62 | 6.48 |
| Structural elongation Ax (%) | 1.14 | 1.31 | 1.41 | 1.78 |
| E-modulus (MPa) | 90043 | 81071 | 82232 | 62981 |
| Tensile test embedded | | | | |
| Breaking load Fm (Newton) | 1642 | 1769 | 1695 | 1711 |
| Tensile strength Rm (MPa) | 2008 | 2096 | 2001 | 1948 |
| Total elongation at fracture Ats (%) | 2.28 | 3.08 | 3.03 | 3.55 |
| Structural elongation Ax (%) | 0.24 | 0.46 | 0.56 | 0.72 |
| E-modulus (MPa) | 114312 | 102469 | 93268 | 84589 |

With increasing thickness of the polymer core, the E-modulus decreases while both the total elongation at fracture or break and the structural elongation increase.

INV3 has been experienced as the better invention cord.

Figure 3:
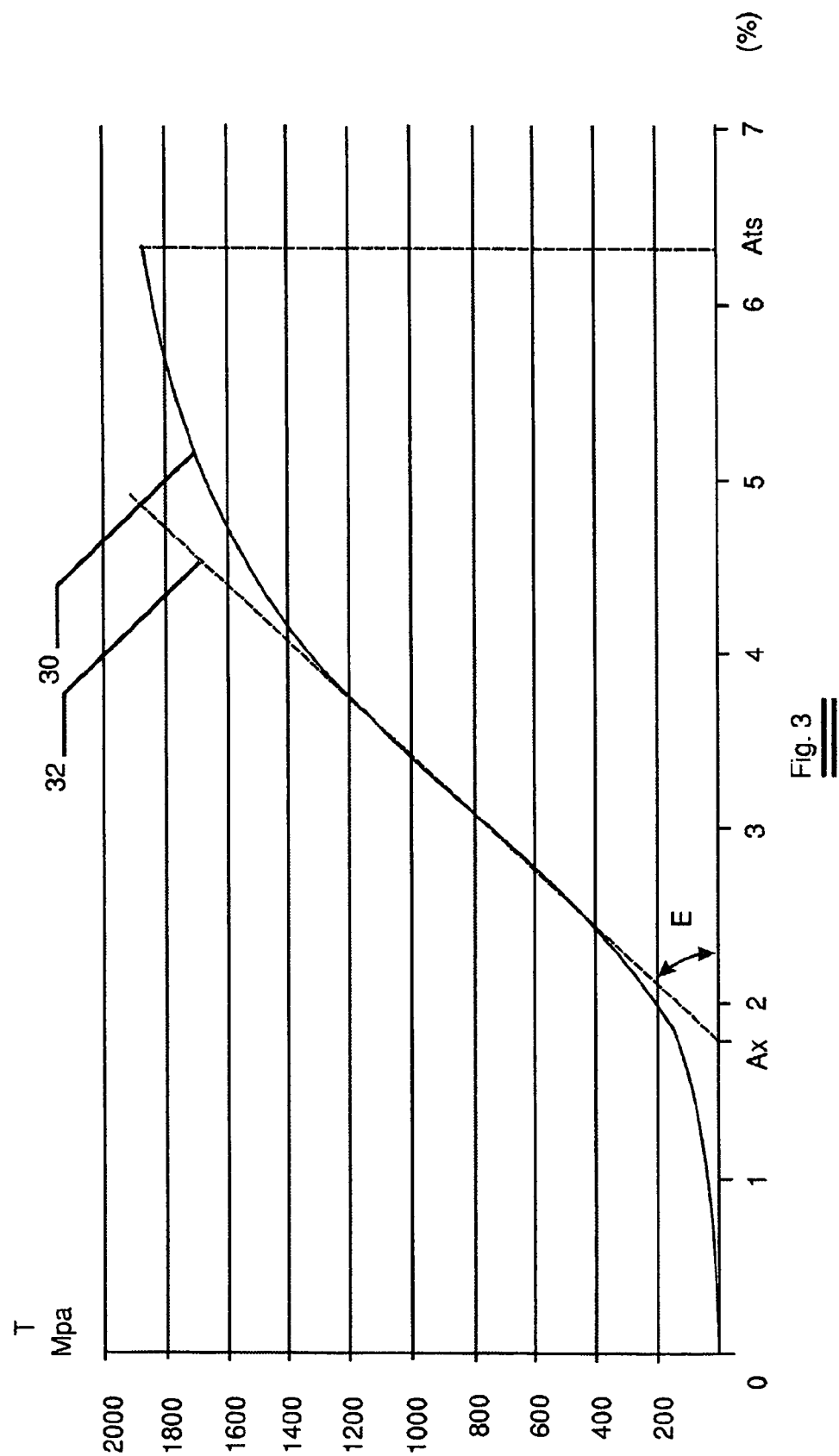
FIG. 3 shows a typical stress-elongation curve of an invention cord.

FIG. 3 shows a tensile stress—elongation curve 30 of this invention cord INV3. This curve 30 can be divided in three main parts. A first part is a non-linear part and has high elongations at low tensile stresses; this is the part of structural elongation. A second part is the middle part and is linear. This part occurs in the elastic field and follows the law of Hooke. The corresponding elongation is the elastic elongation. The third part is non-linear and is the plastic part. The third part is characterized by a saturation phenomenon. The E-modulus is the slope of the line 32, which coincides with the linear part. The structural elongation Ax is the value on the abscissa value where the line 32 intersects with the abscissa axis.

In a broader perspective, the steel filaments of a hybrid elongation cord according to the invention usually have a diameter ranging from 0.03 mm to 0.80 mm, and preferably from 0.05 mm to 0.45 mm. The steel filaments have a composition which is along the following lines: a carbon content ranging from 0.60 to 1.15%, a manganese content ranging from 0.10 to 1.10%, a silicon content ranging from 0.10 to 0.90%, sulfur and phosphorous contents being limited to 0.15%, preferably to 0.010%; additional elements such as chromium (up to 0.20-0.40%), copper (up to 0.20%), nickel (up to 0.30%), cobalt (up to 0.20%) and vanadium (up to 0.30%) may be added.

The final tensile strength Rm of the filaments depends upon its diameter: for example, a 0.2 mm normal tensile filament has a Rm of above about 2800 Mega Pascal (MPa), a 0.2 mm high tensile filament has a Rm of above about 3400 MPa, a 0.2 mm super high tensile filament has a Rm of above about 3600 MPa and a 0.2 mm ultra high tensile filament has a Rm of above about 4000 MPa.

For the highest tensile strengths, the following steel composition is suitable: a carbon content ranging from 0.90% to 1.10%, a silicon content below 0.40%, a manganese content below 0.50% and a chromium content ranging from 0.10% to 0.30%.

The steel filaments are coated with a layer that promotes the adhesion to the rubber: copper alloy coatings such as brass (either low—63.5% Cu—and high copper—67.5% Cu) or a complex brass coating (Ni+brass, brass+Co . . . ). Zinc coatings treated with silanes for rubber adhesion are also possible.

The invention claimed is:

1. An elongation cord adapted for the reinforcement of elastomer structure, said cord comprising:
    a core, said core being a polymer core, and
    three to nine strands twisted around said core with a cord twisting step in a cord twisting direction,
    wherein:
    at least one of said strands comprises a first group of filaments and a second group of filaments,
    said first group of filaments being twisted with a first twisting step in a first twisting direction,
    said second group of filaments being twisted with a second twisting step in a second twisting direction,
    said first twisting step being different from said second twisting step or said first twisting direction being different from said second twisting direction, or both,
    said first twisting direction being equal to said cord twisting direction, and said first twisting step being equal to said cord twisting step,
    wherein said polymer is polyester.

2. A cord according to claim 1, wherein said first group of filaments comprises between two and five filaments.

3. A cord according to claim 1, wherein said second group of filaments comprises between one and five filaments.

4. A cord according to claim 1, wherein all of said strands comprise such a first group of filaments and such a second group of filaments.

5. A cord according to claim 1, wherein said cord has a structural elongation of at least 1.20%.

6. A cord according to claim 1, wherein said polymer core has a thickness which is greater than or equal to a smallest diameter of the filaments in said first group or in said second group.

7. A cord according to claim 6, wherein said polymer core has a thickness which is greater than or equal to two times the smallest diameter of the filaments in said first group or in said second group.

8. A cord according to claim 1, wherein said cord has an elongation at break of at least 5%.

* * * * *